(12) United States Patent
Shima

(10) Patent No.: US 6,977,734 B2
(45) Date of Patent: Dec. 20, 2005

(54) PRINTER AND CONTROL PROGRAM PRODUCT THEREFOR

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 998 days.

(21) Appl. No.: 09/944,074

(22) Filed: Sep. 4, 2001

(65) Prior Publication Data

US 2002/0032704 A1    Mar. 14, 2002

(30) Foreign Application Priority Data

Sep. 5, 2000    (JP) ............................... 2000-268025

(51) Int. Cl.⁷ ........................... G06F 15/00; G06K 1/00

(52) U.S. Cl. .................. 358/1.12; 358/1.15; 358/1.12; 358/1.13; 348/53; 348/55

(58) Field of Search .............................. 358/1.13, 1.15, 358/1.12; 700/14, 18; 346/20, 30, 52, 53, 346/55, 57, 58, 59, 80

(56) References Cited

U.S. PATENT DOCUMENTS 5,913,018 A  *  6/1999  Sela .......................... 358/1.17

FOREIGN PATENT DOCUMENTS

| EP | 0821319 | 1/1998 |
|----|---------|--------|
| EP | 0843279 | 5/1998 |
| EP | 0994437 | 4/2000 |
| GB | 2337144 | 11/1999 |
| JP | 2000-168148 | 6/2000 |

* cited by examiner

*Primary Examiner*—Edward Coles
*Assistant Examiner*—Yixing Qin
(74) *Attorney, Agent, or Firm*—Mattingly, Stanger, Malur & Brundidge, P.C.

(57) ABSTRACT

In n page unit printing, a completion time of print preparation for page m+1 is estimated from the time spent for print preparation for pages up to page m among n pages. If the estimated time can make m+1 unit printing effective, print preparation for page m+1 is waited for. If the estimated time can not make m+1 unit printing effective, m page unit printing is immediately performed up to page m, without waiting for the completion of print preparation of page m+1.

19 Claims, 5 Drawing Sheets

PROCESSING TIMING OF SHEET n (1): INTERPRETATION START TIME OF SHEET n
(2): INTERPRETATION FINISH TIME OF SHEET n
(3): ESTIMATED INTERPRETATION FINISH TIME OF SHEET n + 1
(4): PRINT START TIME OF SHEET n
(5): TIME LIMIT ((4) + T)

t: ELAPSED INTERPRETATION TIME ((2) - (1))
T: MAXIMUM WAITING TIME (3)': ESTIMATED PRINTING START TIME OF SHEET n + 1 ((4) + t)

(2): INTERPRETATION FINISH TIME OF PAGE m
(3): ESTIMATED INTERPRETATION FINISH TIME OF PAGE m + 1 ((2) + $t'_{m+1}$)
(4): PRINTING START TIME OF PAGE m (COMPLETION TIME OF PRINT PREPARATION)
(5): TIME LIMIT ((4) + T)
$t_m$: ELAPSED INTERPRETATION TIME OF PAGE m
$t'_{m+1}$: ESTIMATED ELAPSED INTERPRETATION TIME OF PAGE m + 1 ($t_1 + t_2 + ... t_m / m$)

PRINTER AND CONTROL PROGRAM PRODUCT THEREFOR

BACKGROUND OF THE INVENTION

1. Field of the Invention

The present invention relates to a printer which allows unit printing of a plurality of pages, particularly to a printer which can reduce printing hours on the whole, and a control program product thereof.

2. Description of the Related Art

Use of page printers which can print by unit of a page has been rapidly spreading in offices and private residences in recent years, and an acceleration of printing speed, price reduction, and improvement in quality are desired. Of these so far, various techniques have been developed for accelerating printing speed. One of these techniques is unit printing of a plurality of pages.

This technique is for executing printing of a plurality of pages at one time in one printing processing. When two pages are printed at one time in one printing processing, it is called "2 page unit printing" or "2 up printing", and when n pages are printed at one time in one printing processing, it is called "n page unit printing" or "n up printing".

This unit printing of a plurality of pages is explained in detail hereinafter, giving an example of 2 up printing. For example, a page printer, which can print a paper of size A3, usually has a transfer body (intermediate transfer medium) for transferring a toner image to a paper; this transfer body has a 1 page size of paper of size A3. Therefore, only one page of size A3 can be printed in one printing processing. Here, if it is color printing, one time of printing processing is concretely performed such that 4 colors of toner are adhered to the transfer body one by one in order, by 1 rotation of the transfer body for 1 color, and while the last color of toner is being adhered, the toner image of 4 colors that were adhered is transferred from the transfer body to a paper. Accordingly, one time of printing processing requires more than 4 rotations of the transfer body.

With this type of page printer, by regarding printing images of a portion of 2 pages of size A4 the same as a printing image of 1 page of size A3, processing of 2 pages of size A4 can be performed in the same processing time as the printing processing for 1 page of size A3. Thus, printing 2 pages by 1 printing processing is called 2 up printing.

With this printer for size A3 which can perform 2 up printing, when printing an image of only 1 page of size A4 (1 up printing or 1 page printing), an area of the transfer body to which a toner is adhered becomes half. However, in color printing, adhesion of 4 colors of toner to the transfer body is performed, as described before, by one rotation of the transfer body for each color, regardless of where the colors adhere. Therefore, 4 rotations of the transfer body are required for printing 1 sheet of paper of size A4. The rotation speed of the transfer body is usually fixed, therefore, the time required for printing 1 sheet of paper of size A4 is almost the same as the time required for printing 1 sheet of paper of size A3, that is, the time required for printing images of 2 pages of size A4 by 2 up printing. Accordingly, when printing 2 pages of size A4, if 2 up printing is possible, it can greatly reduce the printing time, compared to printing each paper (1 up printing).

However, in order to perform 2 up printing, data for 2 pages has to be output from the controller of the printer to the engine member which performs actual printing. In Short, the controller has to perform data processing for the 2 pages and supply the data to the engine member, and the engine member has to be ready for printing, otherwise, 2 up printing can not be performed.

Therefore, if it takes time for data of page 2 to reach the engine member after data for page 1 has reached the engine member, there may be cases where printing can be finished earlier by performing 1 up printing for each page than by waiting for the data (to reach the engine member) and performing 2 up printing. Therefore, whether the 2 up printing is effective depends on the waiting time for the data of the 2 pages to reach the engine. And the critical waiting time in which the effect of the 2 up printing can be achieved, is called a maximum waiting time T. This waiting time is obtained by deducting the time required for 2 up printing from the time required for printing 2 pages by 2 times of 1 up printing. If the data of the 2 pages reaches the engine member by the maximum waiting time T, 2 up printing is effective.

For example, if the time required for printing 2 pages by 2 times of 1 up printing is 20 seconds and the time required for 2 up printing is 11 seconds, the maximum waiting time T is 9 seconds. If the data of page 2 reaches the engine member within 9 seconds after the data for page 1 reaches the engine member, it means that 2 up printing is effective.

The unit printing of a plurality of pages has been explained so far using the example of 2 up printing. n up printing of more than 3 pages is similar. There is a time limit, which is based on a difference between the time required for printing m pages in m page unit printing as well as printing 1 page in 1 page unit printing for page m+1, and the time required for printing m+1 pages in m+1 page unit printing. Accordingly, if the data for page m+1 does not reach the engine member during the maximum waiting time, there is no benefit to wait for page m+1 (to reach the engine member) and perform m+1 up printing.

Thus, the time required for data of the next page to reach the engine member is the key to efficiently control n up printing, but this waiting time changes depending on the amount of the data of the page and the condition of communication between a host computer for giving printing orders and a printer. Therefore, the waiting time can not be easily predicted.

As one of the methods of controlling n up printing, a method exists of waiting for data of next page (to reach the engine member) until a certain time (for example, a maximum waiting time T) and performing printing up to the present page if the data does not reach the engine member by the certain time. But, in this method, printing is always started after waiting for the data until the certain time. Therefore, if there are many cases where the data of the next page does not reach the engine member by the certain time, there is only a small amount of time saved in spite of the total waiting time. And so, this method is not necessarily an effective control method.

Therefore, the object of the present invention is to provide a printer which can shorten the time required for printing in unit printing of a plurality of pages, and a program product for controlling such printer.

SUMMARY OF THE INVENTION

In order to achieve the aforementioned object, one aspect of the present invention is that, in n page unit printing, a completion time of print preparation for page m+1 is estimated from the time required for print preparation for page m among n pages, and completion of the print preparation for page m+1 is waited for if the estimated time makes m+1 page unit printing effective, however, completion of the print preparation for page m+1 is not waited for but m page unit printing up to page m is immediately performed if the estimated time does not make m+1 page unit printing effective. Accordingly, in the present invention, when it is estimated that waiting for completion of the print preparation for a next page will not be effective, printing up to the present page is immediately executed. Thus, the problem of always waiting for a prescribed period is solved; therefore, on the whole the printing time can be shortened.

In order to achieve the aforementioned object, another aspect of the present invention is a printer, comprising: a controller for interpreting a print command received, performing print preparation by a unit of a page, and giving instructions for printing; and an engine for executing printing according to the print command, wherein said controller: calculates, when print preparation for a first page is completed, an estimated completion time of print preparation for a second page; judges whether the estimated completion time of print preparation is later than a prescribed time limit, which is based on the difference between the time required for printing 2 pages by 1 page unit printing and the time required for printing 2 pages by 2 page unit printing; and gives to the engine an instruction for 1 page unit printing for the first page if the controller judges that the estimated completion time of print preparation is later than the prescribed time limit, but; on the other hand, if the controller judges that the estimated completion time is earlier than the time limit, it further judges whether the print preparation for the second page was completed by a first time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page.

In the above invention, a preferred mode is that the first time is the prescribed time limit.

In the above invention, another mode is that the first time is the estimated completion time of print preparation.

In the above invention, another mode is that the estimated completion time of print preparation is calculated based on an elapsed interpretation time which is obtained by deducting the time when the interpretation of the first page was started from the time when the interpretation of the first page was finished.

In the above invention, another mode is that the estimated completion time of print preparation is obtained by adding the elapsed interpretation time to the time when the interpretation of the first page was finished.

In the above invention, another mode is that the estimated completion time of print preparation is obtained by adding the elapsed interpretation time to the time when the print preparation for the certain page was completed.

In order to achiever the aforementioned object, another aspect of the present invention is a method executed by a control program of a printer which interprets a print command received, performs print preparation by a unit of a page, and executes printing, comprising: a step of calculating, when print preparation for a first page is completed, an estimated completion time of print preparation for a second page; a step of judging whether the estimated completion time of print preparation is later than a prescribed time limit, which is based on the difference between the time required for printing 2 pages by 1 page unit printing and the time required for printing 2 pages by 2 page unit printing; and a step of giving to the engine an instruction for 1 page unit printing for the first page if the controller judges that the estimated completion time of print preparation is later than the prescribed time limit, but; on the other hand, if the controller judges that the estimated completion time is earlier than the time limit, it further judges whether the print preparation for the second page was completed by a first time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page.

In the above invention, a preferred mode is that the first time is the prescribed time limit.

In the above invention, another mode is that the first time is the estimated completion time of print preparation.

In the above invention, another mode is that the estimated completion time of print preparation is calculated based on an elapsed interpretation time which is obtained by deducting the time when the interpretation of the first page was started from the time when the interpretation of the first page was finished.

In order to achieve the aforementioned object, another aspect of the present invention is a printer, comprising: a controller for interpreting a print command received, performing print preparation by a unit of a page, and giving instructions for printing; and an engine for executing printing according to the print command, wherein said controller: calculates, when print preparation for a first page is completed, an estimated completion time of print preparation for a second page; judges whether the estimated completion time of print preparation is later than a prescribed time limit, which is based on the difference between the time required for printing 2 pages by 1 page unit printing and the time required for printing 2 pages by 2 page unit printing; and if the controller judges that the estimated completion time of print preparation is later than the prescribed time limit, it further judges whether the print preparation for the second page was completed by a first time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page, but; on the other hand, if the controller judges that the estimated completion time is earlier than the time limit, it further judges whether the print preparation for the second page was completed by a second time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page.

In the above invention, a preferred mode is the first time is the prescribed time limit and the second time is the estimated completion time of print preparation for the second page.

In order to achieve the above mentioned object, another aspect of the present invention is a method executed by a control program of the printer which interprets a print command received, performs print preparation by a unit of a page, and executes printing, comprising: a step of calculating, when print preparation for a first page is completed, an estimated completion time of print preparation for a second page; a step of judging whether the estimated completion time of print preparation is later than a prescribed time limit, which is based on a difference between the time required for printing 2 pages by 1 page unit printing and the time required for printing 2 pages by 2 page unit printing; and a step, wherein if the controller judges that the estimated completion time of print preparation is later than the prescribed time limit, it further judges whether the print preparation for the second page was completed by a first time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page, but; on the other hand, if the controller judges that the estimated completion time is earlier than the time limit, it further judges whether the print preparation for the second page was completed by a second time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page.

In the above invention, a preferred mode is that the first time is the prescribed time limit and the second time is the estimated completion time of print preparation for the second page.

In order to achieve the aforementioned object, another aspect of the present invention is a printer, comprising: a controller for interpreting a print command received, performing print preparation by a unit of page, and giving instructions for printing; and an engine for executing printing according to the print command, wherein: when print preparation for page m was completed in n page unit printing, the controller gives to the engine an instruction for m page unit printing for pages up to page m if the value of m is equal to the value of n; when the value of m is smaller than the value of n, the controller calculates an estimated completion time of print preparation for page m+1; the controller compares the estimated completion time of print preparation which was calculated with a prescribed time limit which is based on the difference between the time required for printing m pages in m page unit printing as well as printing 1 page in 1 page unit printing for page m+1, and the time required for printing m+1 pages in m+1 page unit printing; and if the controller judges that the estimated completion time of print preparation is later than the time limit, it gives to the engine an instruction for m page unit printing for page m; on the other hand, if the controller judges that the estimated completion time is earlier than the time limit, it further judges whether the print preparation for page m+1 was completed by a first time, and if it judges that the print preparation for page m+1 was completed, it replaces the value m with the value of m+1 and executes the processing which is executed when the print preparation for page m was completed, and if the controller judges that the print preparation was not completed by the first time, it gives to the engine an instruction for the m page unit printing.

In the above invention, a preferred mode is that the first time is the prescribed time limit.

In the above invention, another mode is that the first time is the estimated completion time of print preparation.

In the above invention, another mode is that the estimated completion time of print preparation is calculated based on a mean time of the elapsed interpretation time, from its beginning to the end, of each page up to page m.

In order to achieve the aforementioned object, another aspect of the present invention is a method executed by a control program of a printer which interprets a print command received, performs print preparation by a unit of a page, and executes printing, comprising: a first step, wherein, when the print preparation for page m is completed in n page unit printing, the value of m is compared with the value of n; a second step, wherein, the controller gives to the engine an instruction for m page unit printing for pages up to page m if the value of m is equal to the value of n; a third step, wherein, when the value of m is smaller than the value of n, the controller calculates an estimated completion time of print preparation for page m+1; a forth step, wherein, the controller compares the estimated completion time of print preparation which was calculated with a prescribed time limit which is based on the difference between the time required for printing m pages in m page unit printing as well as printing 1 page in 1 page unit printing for page m+1, and the time required for printing m+1 pages in m+1 page unit printing; and a fifth step, wherein, if the controller judges that the estimated completion time of print preparation is later than the time limit, it gives to the engine an instruction for m page unit printing for page m; on the other hand, if the controller judges that the estimated completion time is earlier than the time limit, it further judges whether the print preparation for page m+1 was completed by a first time, and if it judges that the print preparation for page m+1 was completed, it replaces the value m with the value of m+1 and executes the processing from the first step, and if the controller judges that the print preparation was not completed by the first time, it gives to the engine an instruction for the m page unit printing.

Further objects and characteristics of the present invention are going to be clarified in the embodiments described hereinafter.

DESCRIPTION OF THE PREFERRED EMBODIMENT

Figure 1:
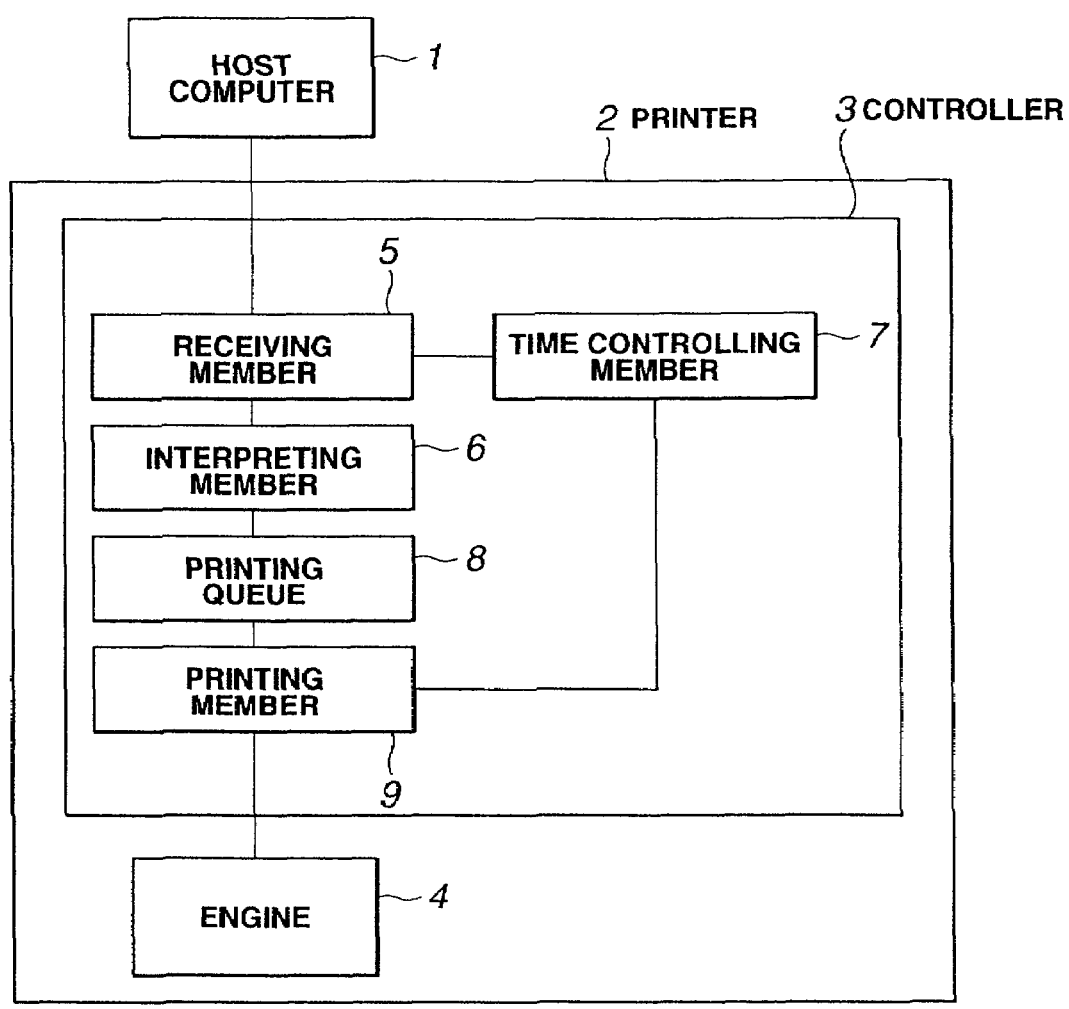
FIG. 1 shows a schematic structure of the printer according to one embodiment of the present invention.

Embodiments of the present invention are explained hereinafter with reference to the drawings, but such embodiments do not limit the technical range of the present invention. Furthermore, in the drawings, the same or similar materials have the same reference numerals or reference signs.

FIG. 1 shows a schematic structure of the printer according to one of the embodiments of the present invention. In the figure, a printer 2, connected to a host computer 1 such as a personal computer, is a page printer which allows unit printing of a plurality of pages based on a printing job sent from the host computer 1.

The printer 2 is roughly divided to a controller 3 and an engine 4. The controller 3 interprets a printing job received from the host computer 1 and outputs it to the engine 4 as data which can be printed. The engine 4 executes the actual printing operation according to the output data.

As shown in the figure, the controller 3 of the printer 2 comprises a receiving member 5, interpreting member 6, time controlling member 7, a printing queue 8, and a printing member 9. The receiving member 5 has a role as a buffer which receives a group of printing jobs sent from the host computer 1 and transmits it to the interpreting member 6 in order. The interpreting member 6 interprets, page by page, the printing job sent from the receiving member 5 and generates print requirement data for each page. Concretely, the interpreting member 6 interprets the printing jobs which are described in the page description language such as PostScript or ESC/Page, generates the print requirement structure (print requirement data) including all the information necessary for printing 1 page, and transmits in order the structure to the printing queue Moreover, the time controlling member 7 responds to the requests from the other members such as the interpreting member 6 etc., and provides the time at that point. The printing queue 8 performs a role as a buffer which accumulates the print requirement data sent from the interpreting member 6. Finally, the printing member 9 has the function of making the engine 4 perform printing based on the print requirement data, and the printing member 9 takes out the print requirement data from the printing queue 8 in accordance with the condition of the engine 4, converts it in order to a band image, and transmits it to the engine 4.

In performing unit printing of a plurality of pages, the printer 2, applied to the present invention and having the aforementioned structure, estimates, at a point when the print preparation for each page has been completed, the completion time of print preparation for the next page, from the time required for print preparation up to the present page in the unit printing of a plurality of pages. And the printer 2 determines whether to immediately start printing up to the present page in accordance with the estimated time.

The details of printer 2 control is hereinafter explained by giving an example of 2 page unit printing.

Figure 2:
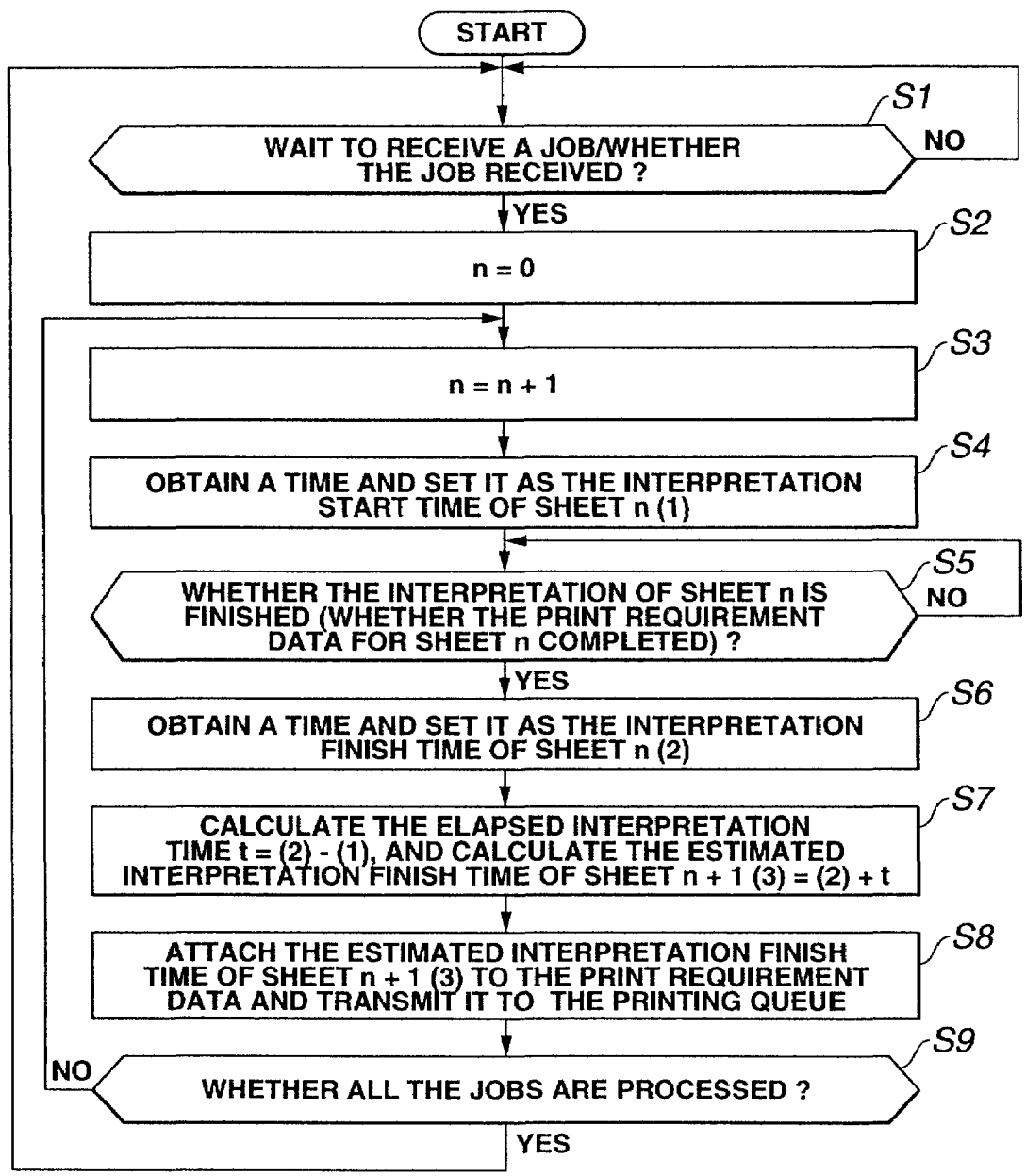
FIG. 2 shows the processing flow at the interpreting member of the printer according to the above embodiment.
Figure 3:
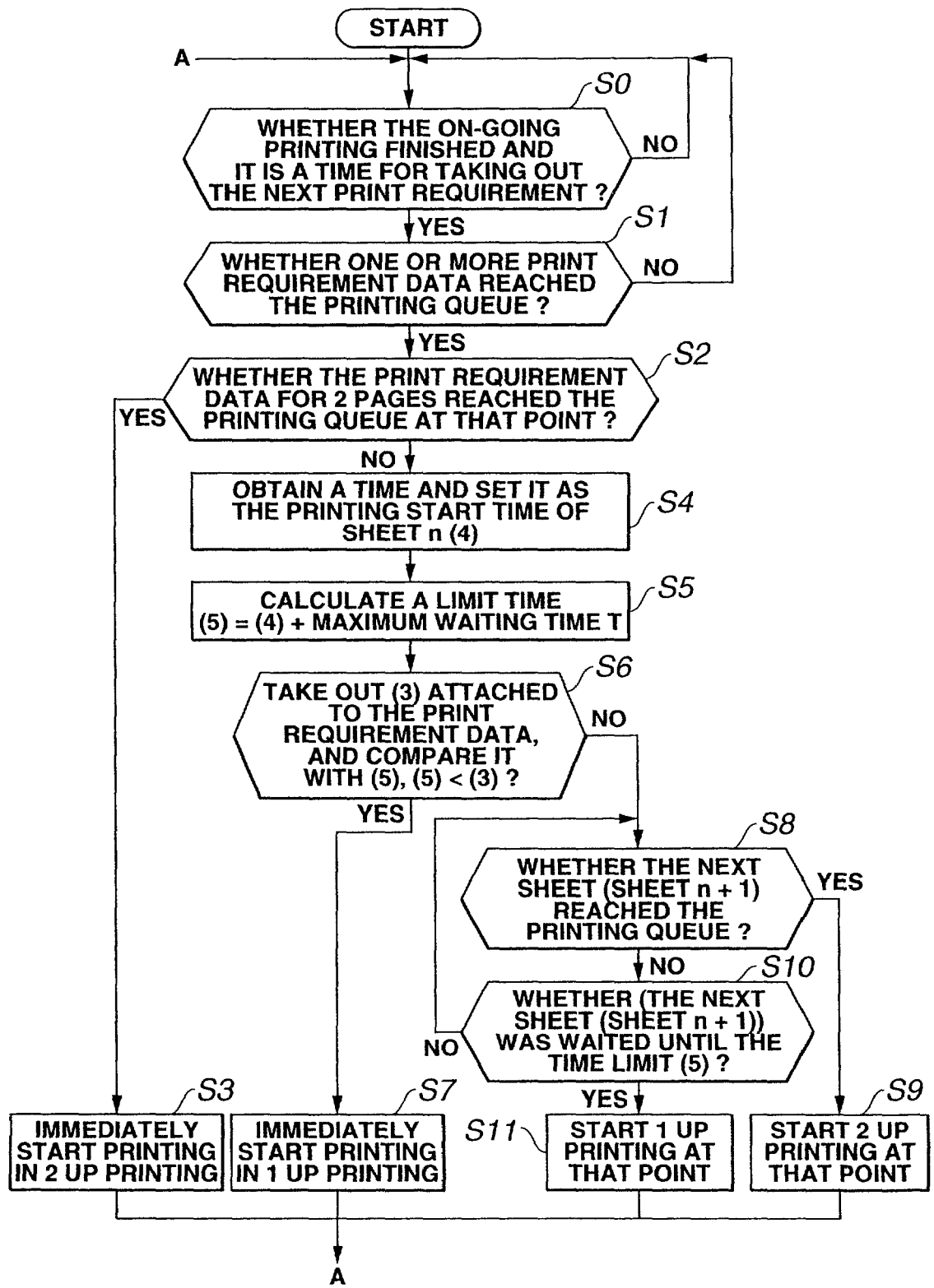
FIG. 3 shows the processing flow at the processing member of the printer according to the above embodiment.

FIG. 2 and FIG. 3 show the processing flows of the interpreting member 6 and the printing member 9 of the printer 2 according to the embodiment, respectively. Moreover, FIG. 4 explains the processing timing of the interpreting member 6 and the printing member 9. The details of the processing performed by the controller 3 of the printer 2, are hereinafter explained based on the FIGS. 2 to 4. Furthermore, in the following explanation, size of a page means a size which allows 2 up printing.

Firstly, the interpreting member 6 waits for the receiving member 5 to receive a printing job sent from the host computer 1 (step S1 in FIG. 2). When the receiving member 5 receives the printing job, the interpreting member 6 initializes the page number n in the job (step S2 in FIG. 2), increases the value of n by one, and starts interpreting page 1 (step S3 in FIG. 2) In the beginning, the interpreting member 6 obtains a time from the time controlling member 7 and sets the time as an interpretation start time of a first sheet 1 (1) ((1) in FIG. 4) (step S4 in FIG. 2). Furthermore, the details of the processing from step S3 to step S9 in FIG. 2 are always the same regardless of the page number n in the job; therefore, the explanation of the details of the processing is not limited to page 1 but instead up to page n (sheet n).

Next, the interpreting member 6 interprets sheet n; that is, it executes generation of the print requirement structure (print requirement data) of the above sheet n (step S5 in FIG. 2), and when the generation is completed, the interpreting member 6 obtains a time again from the time controlling member, and sets the time as an interpretation finish time of sheet n (2) ((2) in FIG. 4) (step S6 in FIG. 2) Here, the interpreting member 6 calculates an elapsed interpretation time t (t in FIG. 4) by deducting the interpretation start time of sheet n (1) from the obtained interpretation finish time of sheet n (2), and it calculates an estimated interpretation finish time of sheet n+1 (3) ((3) in FIG. 4) by adding the value of the elapsed interpretation time t to the interpretation finish time of sheet n (2) (step S7 in FIG. 2)

There are cases where the elapsed interpretation time t obtained in the step includes not only the time spent for interpretation by the interpreting member 6 but also the time spent for receiving (the printing job) from the host computer 1. This is because there are cases in which the interpretation by the interpreting member 6 precedes (the receiving member 5's reception of the printing job) and the process of receiving the content of page n in the job can be rate-determining, if the communication between the host computer 1 and the printer 2 takes time due to the network connecting the two being busy. Moreover, the reason why the interpretation finish time of sheet n+1 (3) is the estimated interpretation finish time of sheet n (2)+(added) the elapsed interpretation time t, is that it is supposed there will be no great differences, between 2 successive pages, in the interpretation time due to the amount of data, and in communication time due to the network being busy.

Next, the interpreting member 6 attaches the interpretation finish time of sheet n+1 (3) to the print requirement data of sheet n, and transmits it to the printing queue 8 (step S8 in FIG. 2). The processing from step S3 to step S8 in FIG. 2 is executed for every page in the whole printing job (step S9 in FIG. 2).

The print requirement data generated as above in a unit of a page, is one time stored in the printing queue 8 as described above, and it waits to be taken out of the printing member 9. The printing member 9 judges, as shown in FIG. 3, whether it can take out the next print requirement data and give the engine 4 an instruction for printing by monitoring the situation of the engine 4 (step S0 in FIG. 3)

Here, if it is a time to take out the next print requirement data, the printing member 9 first checks whether one or more print requirement data have reached the printing queue 8 (step S1 in FIG. 3), and if not, it waits until one or more print requirement data reaches the printing queue 8. If the print requirement data already reached the printing queue 8, the printing member 9 takes it out from the printing queue 8. However, if the print requirement data for 2 sheets (sheet n and sheet n+1) already reached the printing queue 8 (step S2 in FIG. 3: Yes), the printing member 9 immediately starts the processing of 2 up printing for the 2 pages (step S3 in FIG. 3) Concretely, after the printing member 9 takes out the requirement data of 2 sheets from the printing queue 8, it converts it to a band image in order, transmits it to the engine 4, and prints the images of the 2 pages on 1 sheet in at one time of printing processing as already described.

On the other hand, if the print requirement data for only 1 page (sheet n) (step S2 in FIG. 3: No) reached the printing queue 8, the printing member 9 obtains a time from the time controlling member 7 and regards it as the printing start time of sheet n (4) (step S4 in FIG. 3). This printing start time of sheet n (4) is the time when print preparation for sheet n is completed. Next, a time limit (5) ((5) in FIG. 4) is calculated by adding the aforementioned maximum waiting time T to the printing start time of sheet n (4) (step S5 in FIG. 3), then the time limit (5) is compared with the estimated interpretation finish time of sheet n+1 (3) (step S6 in FIG. 3)

Here, the printing start time of sheet n (4) does not necessarily correspond to the interpretation finish time of sheet n (2) as shown in FIG. 4. This happens when the processing at the interpreting member 6 precedes the actual printing operation at the engine 4 and thereby the print requirement data is accumulated in the printing queue 8. On the other hand, if the printing operation at the engine 4 precedes (the processing at the interpreting member 6) and printing can be performed at any time; the printing start time of sheet n (4) is almost the same as the interpretation finish time of sheet n (2). Moreover, the time limit (5) is such time that if the print requirement data for the next sheet (sheet n+1) reaches the printing queue 8 by the time limit, it is effective to hold the printing of sheet n and perform 2 up printing of sheet n with sheet n+1.

If the result of the above comparison is that the estimated interpretation finish time of sheet n+1 (3) is later than the time limit (5) (step S6 in FIG. 3: Yes), the printing member 9 immediately takes out the print requirement data of sheet n, which already reached to the printing queue 8, from the printing queue 8 and starts the processing of 1 up printing (step S7 in FIG. 3). This is because it is judged that there is a high possibility of 2 up printing being non-effective, if waiting for the data of the next sheet. FIG. 4(b) shows such case.

Figure 4A:
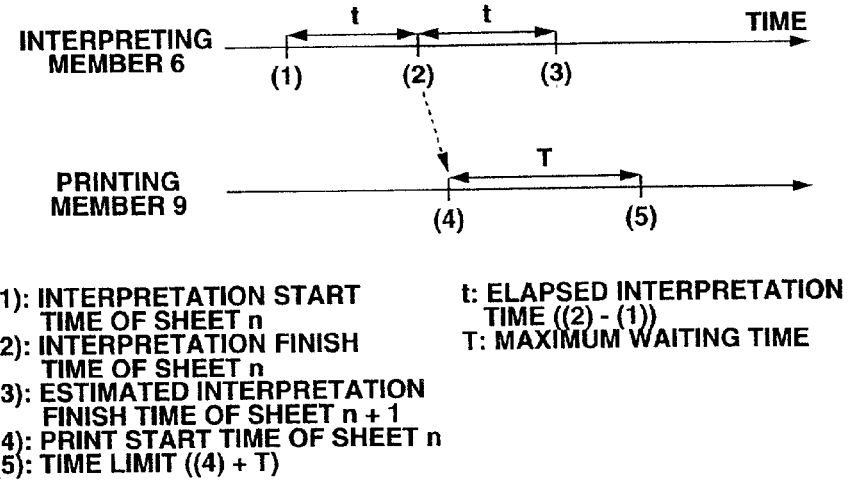
FIGS. 4A, 4B and 4C describe the processing timing at the interpreting member and the printing member.
Figure 4B:
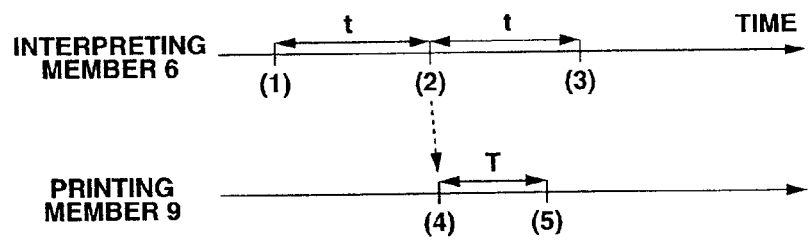

On the other hand, if, as shown in FIG. 4(a), the result of the comparison is that the estimated interpretation finish time of sheet n+1 (3) is earlier than the time limit (5) (step S6 in FIG. 3: No), the printing member 9 does not start the printing processing of sheet n but it waits for the print requirement data of sheet n+1 to reach the printing queue 8 by the time limit (5), and when the print requirement data of sheet n+1 reaches the printing queue 8 (step S8 in FIG. 3: Yes), the printing member 9 starts the processing of 2 up printing of sheet n and sheet n+1 (step S9 in FIG. 3). In this case, printing of sheet n+1 finishes earlier than performing 1 up printing respectively for sheet n and sheet n+1, and so, as a result, 2 up printing becomes effective.

Moreover, if the print requirement data for sheet n+1 does not reach the printing queue 8 by the time limit (5) (step S8 in FIG. 3: No, step 10: Yes), the printing member 9 starts the processing of 1 up printing of sheet n (step S11 in FIG. 3). This is because 2 up printing will not be effective any more even if waiting further for the data of the next page to reach the printing queue 8.

Figure 4C:
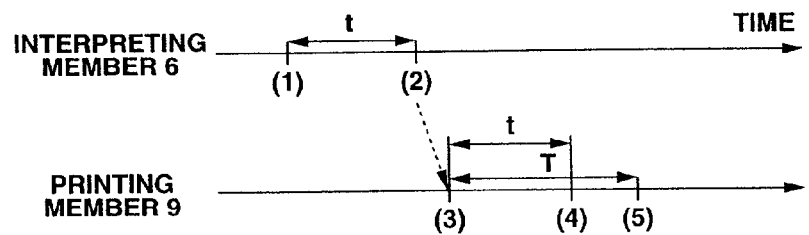

As explained, this embodiment uses a method wherein, whether or not to wait for the data of next sheet (to reach the printing queue 8) is judged by comparing the estimated interpretation finish time of the next sheet (3) with the time limit (5). If it is decided to wait, the printing member waits for the data of the next sheet (to reach the printing queue 8) by the time limit (5). But it is also possible to consider a critical waiting time which waits for the data of the next page as the estimated interpretation finish time of the next sheet (3), instead of the time limit (5). Furthermore, in order to decide whether or not to wait for the data, it is also possible to compare the time limit (5) with the estimated printing start time of the next sheet (sheet n+1) (3)', not with the estimated interpretation finish time of the next sheet (3), as shown in FIG. 4(c). This estimated printing start time of the next sheet (sheet n+1) (3)' is obtained by adding the elapsed interpretation time t to the printing start time of sheet n (4). In the above case, the comparison is the same as the comparison of the elapsed interpretation time t with the maximum waiting time T.

As explained, the printer 2 according to the embodiment estimates the completion time of print preparation for page 2 from the time spent for print preparation for page 1, when performing 2 up printing. If the estimated time makes 2 up printing effective, the printer 2 waits for page 2 (to reach the printing queue 8) for performing 2 up printing, but if not, it immediately prints page 1 without waiting for page 2. Accordingly, the printer 2 waits for page 2 (to reach the printing queue 8) only when there is a high possibility of 2 up printing being effective; therefore, it does not always wait for a prescribed period and the printing time on the whole can be reduced.

And yet, in another embodiment, a method can be used in which, the time to wait for page 2 (to reach the printing queue 8) is changed depending on the estimated completion time of print preparation for page 2. Concretely, it is a method that as a result of the comparison by the printing member 9 of the estimated interpretation finish time of sheet n+1 (3) and the time limit (5) (step S6 in FIG. 3), if the estimated interpretation finish time of sheet n+1 (3) is later than the time limit (5), the printer 2 waits for the data of sheet n+1 (to reach the printing queue 8) until the time limit (5), but if it is earlier than the time limit (5), the printer 2 waits for the data of sheet n+1 (to do so) until the estimated interpretation finish time of sheet n+1 (3). In both cases, if the data of sheet n+1 reaches (the printing queue 8) by the critical waiting time, the printer 2 starts 2 up printing, but if the data does not reach (the printing queue 8) by the critical waiting time, it starts 1 up printing.

In the above embodiment, it is possible to set different waiting times depending on the result of step S6 in FIG. 3; therefore, it is possible to execute effective printing compared with the case of waiting uniformly (for each data) for a prescribed period. Moreover, in the method described concretely as above, if the preparation for page 2 seems to be completed early, the waiting time is reduced, but if it seems that it will be completed late, the waiting time is extended. Therefore, compared with the case of uniformly waiting for (the completion of print preparation for page 2) for a prescribed period of time, it is possible to increase the opportunities of performing 2 up printing without greatly increasing the entire waiting time, and thus the printing time can be on the whole reduced.

The controlling method by the printer 2 in the present embodiment is explained as above using the example of 2 up printing. In n up printing, where n is more than 3, printing is controlled in almost the same way.

In short, printing is controlled such that, in performing n up printing, at a completion point of printing preparation of each page (m page), completion time of print preparation of next page (page m+1) is always estimated, and if the estimated time is later than a time limit, which is based on the difference between the time required for printing 2 pages by 1 page unit printing and the time required for printing 2 pages by 2 page unit printing, the next page is not waited for but printing (m up printing) is immediately executed up to the present page for which print preparation is already ready. If the estimated time is earlier than the time limit, the next page is waited for.

Moreover, in case of waiting for the next page, just like the case of the aforementioned 2 up printing, the next page is waited for until a prescribed time. If the print preparation for the next page is not completed by that time, printing up to the present page (m up printing) is performed, and if the print preparation for the next page is completed by that time, the described processing, which is performed at the completion time of print preparation of the present page, is repeatedly performed for the next page.

Furthermore, the above prescribed time is regarded as the critical waiting time to wait for the next page, and can be set as a time limit or an estimated completion time of print preparation of the next page, just as in the case of 2 up printing.

And yet, the estimated completion time of print preparation of the next page is estimated from the print preparation times of each page for which print preparation has been completed in n up printing. One concrete method is a method to set the printer so that the estimated completion time of print preparation for the next page is obtained by adding the print preparation time of each page for which print preparation has been completed (more precisely the aforementioned mean time of elapsed interpretation times), to the interpretation completed time of the last page (page m) of those print preparations which have been completed. It is also possible to set the printer so that the estimated completion time of print preparation is obtained by adding the above mean time to the printing start time of the last page (page m) In this case, the mean time of the elapsed interpretation time is compared with the time limit, just as in the case of 2 up printing.

Figure 5A:
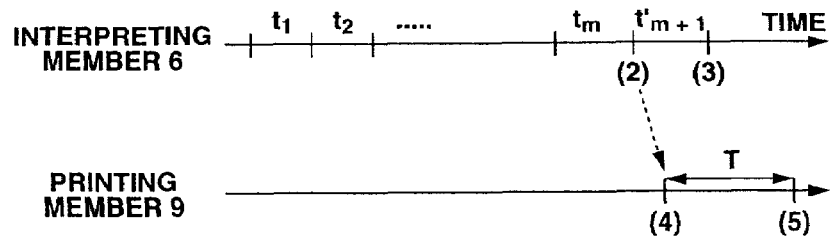
FIGS. 5A and 5B describe the processing in n up printing.
Figure 5B:
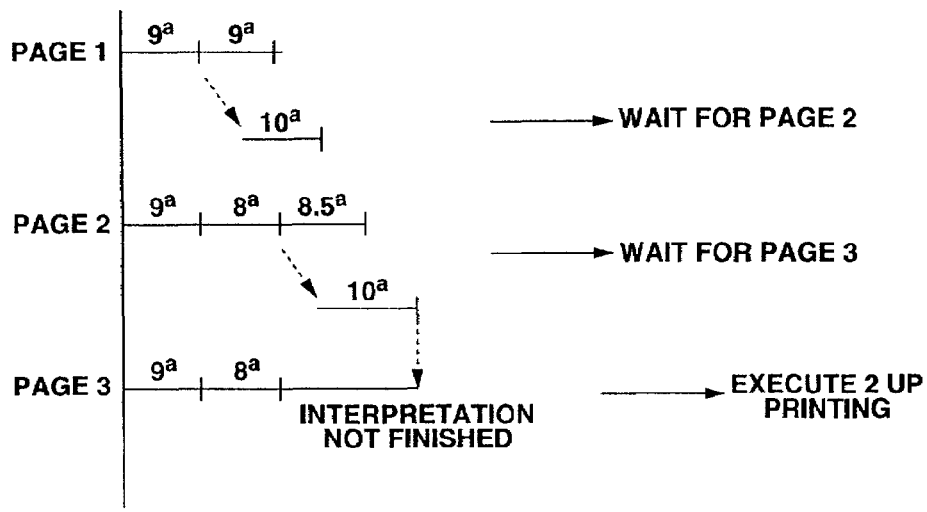

FIG. 5 shows the processing of n up printing when using the mean time. (a) in the figure indicates a processing time at the completion point of print preparation of page m in the n up printing, and (b) indicates one concrete example of using such method.

(2) in (a) in the figure is the interpretation finish time of page m, and as explained, this finish time is added to an estimated elapsed interpretation time $t'_{m+1}$ of page m+1, which is the mean time of elapsed interpretation time of pages up to page m, thereby; the estimated interpretation finish time of sheet m+1 (3) (estimated completion time of print preparation) is determined. As shown in the figure, the estimated elapsed interpretation time $t'_{m+1}$ can be calculated by dividing by m the sum of the elapsed interpretation times $(t_1, t_2, \ldots t_m)$ of each page which print preparation has been completed.

On the other hand, just as in the case of 2 up printing, the time limit (5) is obtained by adding the maximum waiting time T to the printing start time of page m (4). In this method, comparison is made between the estimated interpretation finish time of sheet m+1 (3) and the time limit (5), and if the estimated interpretation finish time of sheet m+1 (3) is later than the time limit, m up printing up to page m is immediately performed as explained. As shown in the figure, if the estimated interpretation finish time of sheet m+1 (3) is earlier, the data of page m+1 to reach the printing queue 8 is waited for, and if the interpretation of page m+1 does not finish by the time limit (5), m up printing up to page m is performed at that point. If the interpretation of page m+1 finishes by the time limit (5), the same processing executed at the time when the interpretation of page m was completed ((2)), is performed. In short, an estimated interpretation finish time of page m+2 is estimated from the elapsed interpretation time of pages up to page m+1, and a determination is made whether page m+2 will be waited for. Moreover, when a number of pages (m) that have their print preparation has been completed reaches n (m=n), a determination is not made whether a next page will be waited, but n up printing is immediately performed.

A concrete example shown in (b) in FIG. 5 indicates that, at first, the elapsed interpretation time of page 1 was 9 seconds. Then, the estimated interpretation finish time of page 2 is estimated to be after 9 seconds by the method described above, and if the maximum waiting time is 10 seconds, a decision to wait for page 2 is made.

Next, it is indicated that the interpretation of page 2 finished after 8 seconds, and the estimated interpretation finish time of page 3 is estimated to be after 8.5 seconds, from the average of the elapsed interpretation times of page 1 and page 2. If the maximum waiting time at this point is 10 seconds, a decision to wait for page 3 is made.

Next, it is indicated that page 3 was waited for but the interpretation of page 3 did not finish by the time limit. In this case, as described, 2 up printing up to page 2 is executed at the point of the time limit.

As explained, in the unit printing of a plurality of pages, the printer according to the present embodiment makes a decision whether to wait for the next page every time the print preparation for one page is completed. And if it is judged that waiting for the next page is not effective, printing up to the present page is immediately executed. Accordingly, the printer does not always have to wait for a prescribed period of time, and there is an effect of shortening the printing time.

The protection range of the present invention is not limited by the above embodiments and it extends to the inventions described in the claims and its equivalents.

EFFECTS OF THE INVENTION

According to the present invention, in n page unit printing, a completion time of print preparation for page m+1 is estimated from the time spent for print preparation for pages up to page m. If the estimated time can make m+1 unit printing effective, print preparation for page m+1 is waited for. If the estimated time can not make m+1 unit printing effective, printing is immediately performed up to page m. Accordingly, if it is assumed that there is no benefit to wait for the next page, printing is immediately performed up to the present page; thus, the problem of always waiting for a prescribed period is solved and there is the effect that on the whole the printing time can be reduced.

DESCRIPTION OF REFERENCE NUMERALS 1 host computer
2 printer
3 controller
4 engine
5 receiving member
6 interpreting member
7 time controlling member
8 printing queue
9 printing member
t elapsed interpretation time
T maximum waiting time

What is claimed is:

1. A printer, comprising:
   a controller for interpreting a print command received, performing print preparation by a unit of a page, and giving instructions for printing; and
   an engine for executing printing according to the print command, wherein said controller:
   calculates, when print preparation for a first page is completed, an estimated completion time of print preparation for a second page;
   judges whether the estimated completion time of print preparation is later than a prescribed time limit, which is based on the difference between the time required for printing 2 pages by 1 page unit printing and the time required for printing 2 pages by 2 page unit printing; and
   gives to the engine an instruction for 1 page unit printing for the first page if the controller judges that the estimated completion time of print preparation is later than the prescribed time limit, but; on the other hand, if the controller judges that the estimated completion time is earlier than the prescribed time limit, it further judges whether the print preparation for the second page was completed by a first time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page.

2. The printer according to claim 1, wherein, the first time is the prescribed time limit.

3. The printer according to claim 1, wherein, the first time is the estimated completion time of print preparation.

4. The printer according to claims 1, wherein, the estimated completion time of print preparation is calculated based on an elapsed interpretation time which is obtained by deducting a time when the interpretation of the first page was started from a time when the interpretation of the first page was finished.

5. The printer according to claim 4, wherein, the estimated completion time of print preparation is obtained by adding the elapsed interpretation time to the time when the interpretation of the first page was finished.

6. The printer according to claim 4, wherein, the estimated completion time of print preparation is obtained by adding the elapsed interpretation time to the time when the print preparation for the certain page was completed.

7. A method executed by a control program of a printer which interprets a print command received, performs print preparation by a unit of a page, and executes printing, comprising:

a step of calculating, when print preparation for a first page is completed, an estimated completion time of print preparation for a second page;

a step of judging whether the estimated completion time of print preparation is later than a prescribed time limit, which is based on the difference between the time required for printing 2 pages by 1 page unit printing and the time required for printing 2 pages by 2 page unit printing; and a step of giving to the engine an instruction for 1 page unit printing for the first page if the controller judges that the estimated completion time of print preparation is later than the prescribed time limit, but; on the other hand, if the controller judges that the estimated completion time is earlier than the prescribed time limit, it further judges whether the print preparation for the second page was completed by a first time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page.

8. The method according to claim 7, wherein the first time is the prescribed time limit.

9. The method according to claim 7, wherein the first time is the estimated completion time of print preparation.

10. The method according claim 7, wherein, the estimated completion time of print preparation is calculated based on an elapsed interpretation time which is obtained by deducting a time when the interpretation of the first page was started from a time when the interpretation of the first page was finished.

11. A printer, comprising:

a controller for interpreting a print command received, performing print preparation by a unit of a page, and giving instructions for printing; and an engine for executing printing according to the print command, wherein said controller:

calculates, when print preparation for a first page is completed, an estimated completion time of print preparation for a second page;

judges whether the estimated completion time of print preparation is later than a prescribed time limit, which is based on the difference between the time required for printing 2 pages by 1 page unit printing and the time required for printing 2 pages by 2 page unit printing; and if the controller judges that the estimated completion time of print preparation is later than the prescribed time limit, it further judges whether the print preparation for the second page was completed by a first time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page, but; on the other hand, if the controller judges that the estimated completion time is earlier than the time limit, it further judges whether the print preparation for the second page was completed by a second time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page.

12. The printer according to claim 11, wherein the first time is the prescribed time limit and the second time is the estimated completion time of print preparation for the second page.

13. A method executed by a control program of the printer which interprets a print command received, performs print preparation by a unit of a page, and executes printing, comprising:

a step of calculating, when print preparation for a first page is completed, an estimated completion time of print preparation for a second page;

a step of judging whether the estimated completion time of print preparation is later than a prescribed time limit, which is based on a difference between the time required for printing 2 pages by 1 page unit printing and the time required for printing 2 pages by 2 page unit printing; and a step, wherein if the controller judges that the estimated completion time of print preparation is later than the prescribed time limit, it further judges whether the print preparation for the second page was completed by a first time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page, but; on the other hand, if the controller judges that the estimated completion time is earlier than the prescribed time limit, it further judges whether the print preparation for the second page was completed by a second time, and if it judges that the print preparation for the second page was completed, it gives to the engine an instruction for 2 page unit printing for the first page and the second page, but if it judges that the print preparation for the second page was not completed, it gives to the engine an instruction for 1 page unit printing for the first page.

14. The printer control program according to claim 13, wherein the first time is the prescribed time limit and the second time is the estimated completion time of print preparation for the second page.

15. A printer, comprising:
a controller for interpreting a print command received, performing print preparation by a unit of page, and giving instructions for printing; and
an engine for executing printing according to the print command, wherein:
when print preparation for page m was completed in n page unit printing, the controller gives to the engine an instruction for m page unit printing for pages up to page m if the value of m is equal to the value of n;
when the value of m is smaller than the value of n, the controller calculates an estimated completion time of print preparation for page m+1;
the controller compares the estimated completion time of print preparation which was calculated with a prescribed time limit which is based on the difference between the time required for printing m pages in m page unit printing as well as printing 1 page in 1 page unit printing for page m+1, and the time required for printing m+1 pages in m+1 page unit printing; and
if the controller judges that the estimated completion time of print preparation is later than the time limit, it gives to the engine an instruction for m page unit printing for page m; on the other hand, if the controller judges that the estimated completion time is earlier than the time limit, it further judges whether the print preparation for page m+1 was completed by a first time, and if it judges that the print preparation for page m+1 was completed, it replaces the value m with the value of m+1 and executes the processing which is executed when the print preparation for page m was completed, and if the controller judges that the print preparation was not completed by the first time, it gives to the engine an instruction for the m page unit printing.

16. The printer according to claim 15, wherein the first time is the prescribed time limit.

17. The printer according to claim 15, wherein the first time is the estimated completion time of print preparation.

18. The printer according to claim 15, wherein the estimated completion time of print preparation is calculated based on a mean time of the elapsed interpretation time, from its beginning to the end, of each page up to page m.

19. A method executed by a control program of a printer which interprets a print command received, performs print preparation by a unit of a page, and executes printing, comprising:
a first step, wherein, when the print preparation for page m is completed in n page unit printing, the value of m is compared with the value of n;
a second step, wherein, the controller gives to the engine an instruction for m page unit printing for pages up to page m if the value of m is equal to the value of n;
a third step, wherein, when the value of m is smaller than the value of n, the controller calculates an estimated completion time of print preparation for page m+1;
a forth step, wherein, the controller compares the estimated completion time of print preparation which was calculated with a prescribed time limit which is based on a difference between the time required for printing m pages in m page unit printing as well as printing 1 page in 1 page unit printing for page m+1, and the time required for printing m+1 pages in m+1 page unit printing; and
a fifth step, wherein, if the controller judges that the estimated completion time of print preparation is later than the time limit, it gives to the engine an instruction for m page unit printing for page m; on the other hand, if the controller judges that the estimated completion time is earlier than the time limit, it further judges whether the print preparation for page m+1 was completed by a first time, and if it judges that the print preparation for page m+1 was completed, it replaces the value m with the value of m+1 and executes the processing from the first step, and if the controller judges that the print preparation was not completed by the first time, it gives to the engine an instruction for the m page unit printing.

* * * * *